UNITED STATES PATENT OFFICE.

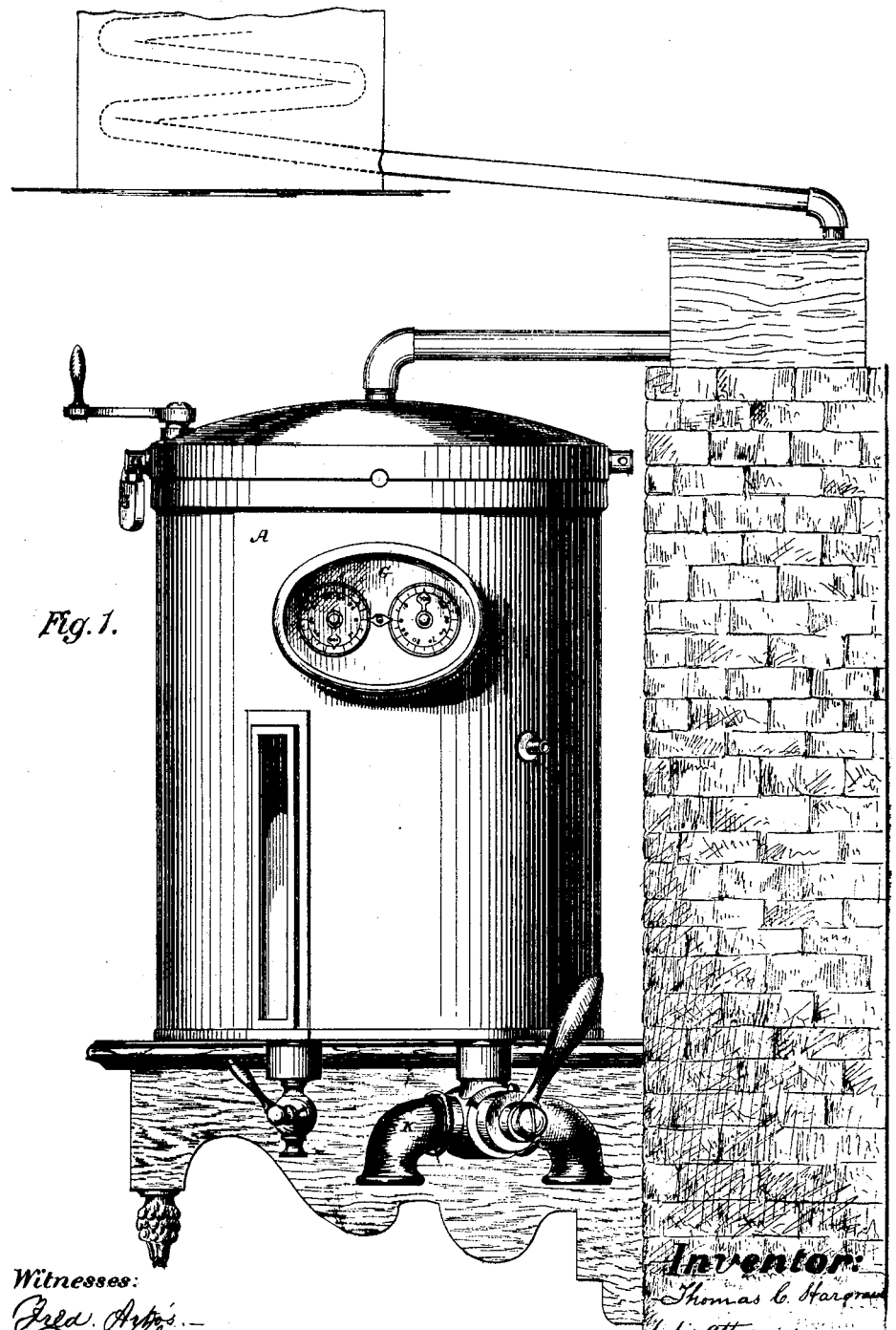

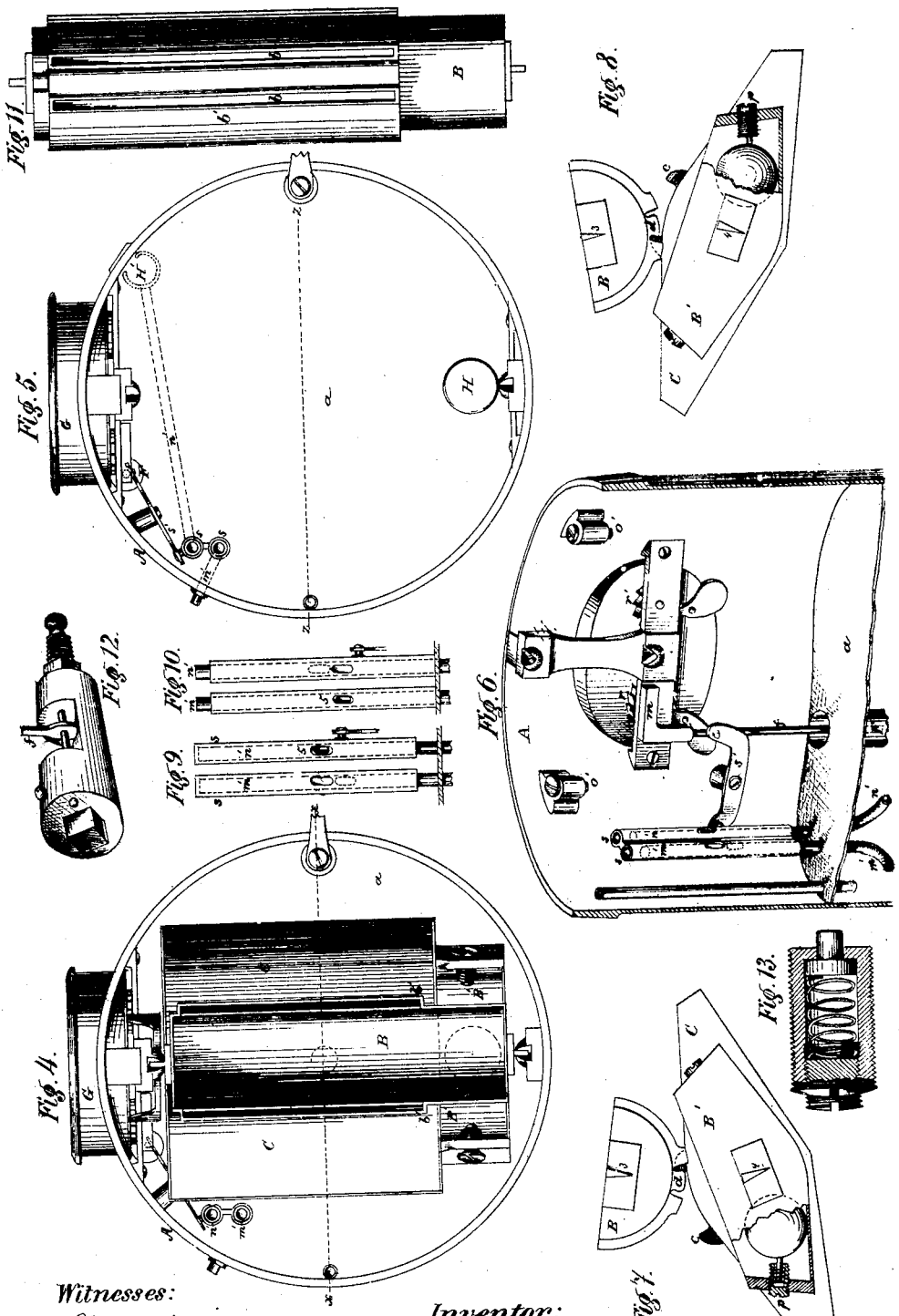

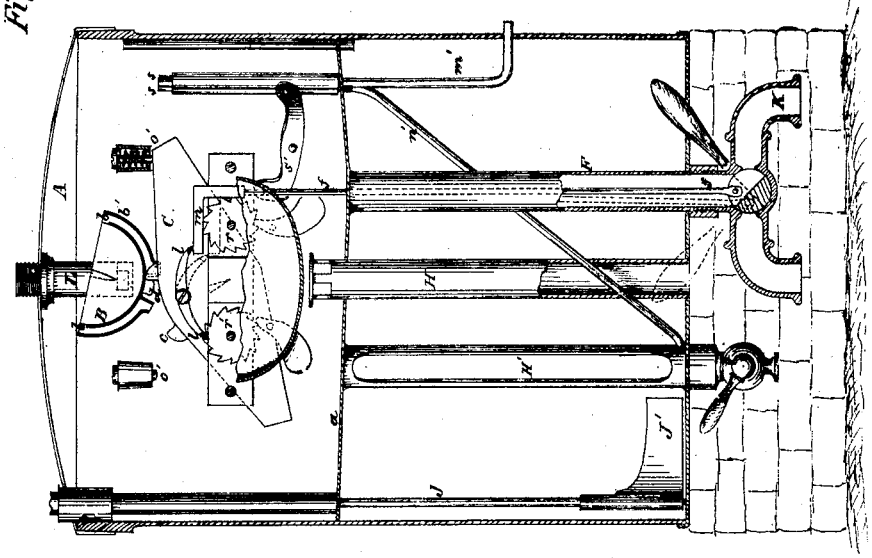
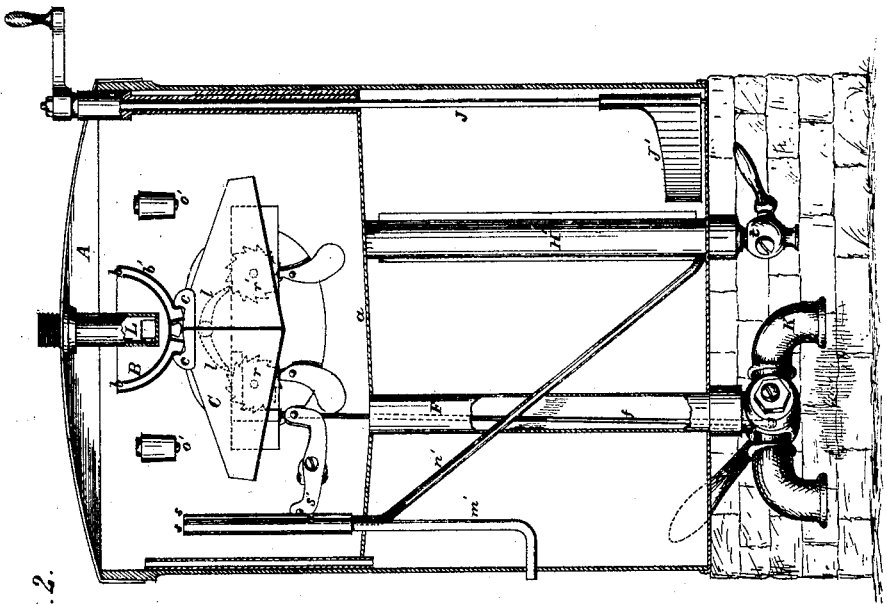

THOMAS C. HARGRAVE, OF BOSTON, MASSACHUSETTS.

IMPROVEMENT IN WATER-METERS.

Specification forming part of Letters Patent No. 113,162, dated March 28, 1871.

*To all whom it may concern:*

Be it known that I, THOMAS C. HARGRAVE, of Boston, Middlesex county, and State of Massachusetts, have invented a new and useful Improvement in Meters for Measuring Liquids, of which the following is a clear, full, and exact description, reference being had to the accompanying drawing, making part of this specification, in which—

Figure 1 is a perspective view of my meter. Fig. 2 is a vertical sectional view through the line $x\ x$, Fig. 4, and looking from the rear toward the front. Fig. 3 is a vertical section in part on the line $z\ z$, Fig. 5, and looking from the front toward the rear. Fig. 4 is a top view of my meter with the cap removed. Fig. 5 is a top view with the receiving and measuring pans removed. Fig. 6 is a vertical sectional view of the upper chamber with the receiving and measuring pans removed. Fig. 7 is an end view of the receiving and measuring pans, showing one position of the same when the meter is in operation. Fig. 8 is the opposite view of the receiving and measuring pans when the meter is in operation. Fig. 9 shows the sample-tubes with the slide exposing the slot leading into the sample-chamber. Fig. 10 shows the same tubes with the other slot exposed. Fig. 11 is a view of the under side of the receiving-pan. Fig. 12 is a view of the valve-plug in the two-way cock. Fig. 13 is a sectional view of my spring-stops.

The object of my invention is the correct measurement of liquids or spirits, either of certain specific gravity or of varying gravities, and whether flowing in a uniform stream or at intervals.

Another object of my invention is to dispense with the use of valves, and thereby simplify the construction of a meter, and prevent its clogging by extraneous matter or sediment in the fluid to be measured, thus securing a more accurate and durable meter than those now in use.

Another object of my invention is an improved manner of collecting and preserving of samples of the fluids or spirits being measured, from which the specific gravity and temperature of the same may be determined.

Another object of my invention is the measuring and separating, when desired, the spirits of high-proof from low-proof by one and the same meter.

To enable others skilled in the art to understand and use my invention, I will proceed to describe the manner in which I have carried it out.

In the said drawing, A is a cylindrical case, divided into two chambers, the one above the other, by a nearly horizontal diaphragm, $a$. The upper chamber contains the mechanism, while the lower chamber receives and holds the samples as collected. Each chamber is provided with the necessary inlets, outlet-pipes, and stop-cocks.

B is an oscillating receiving-pan, of a semi-cylindrical shape, as shown in Figs. 2 and 3, and has an outer case or jacket, $b'$, extending above the outer edges of the pan and below nearly to its center, as shown in Figs. 2, 3, and 11.

Between the receiving-pan B and its jacket $b'$ is an opening, $b$, through which the liquid flows in its passage from the receiving-pan B to the measuring-pan below. The oscillating pan B is suspended at each end upon knife-edges or centers 3, (see Figs. 7 and 8,) secured thereto, and resting in suitable bearings attached to the case A, or, if desired, to a movable frame.

The oscillation of the receiving-pan B is regulated and controlled by the oscillations of the measuring-pan C, as will hereinafter be explained. The oscillating measuring-pan C is divided by a longitudinal central partition into two equal and similar chambers, of such form and proportion as to give a maximum cross-section with a minimum amount of oscillation. The pan C is also hung, like the receiving-pan, upon knife-edges or centers 4, (see Figs. 7 and 8,) resting in suitable bearings attached either to the case A or to a movable frame, if desired.

The movement of the measuring-pan is controlled and regulated by a ball of metal or other heavy material, rolling in the chamber B' upon planes inclined toward each other, and connected at their near ends with a curve, as shown in Figs. 7 and 8.

By this construction of the floor of chamber B' the ball, when at rest, lies upon a horizontal plane, whether at the one end or the other of the chamber, while the side of the measuring-pan opposite the ball is tilted upward and is receiving the liquid. It is, therefore, evident that the slightest downward motion of the tilted side of the pan C will cause the ball to move down an incline, and precipitate it to the opposite end of the chamber until it comes in contact with and rests against the spring-top $p$, where it remains until the other measuring-pan has received its proper quantity of liquid.

The distance which the ball is allowed to roll within its own chamber necessarily determines the oscillation of the measuring-pan, except so far as the pan is arrested by the spring-stops $o'$ $o'$. (See Fig. 3.)

By adjusting the spring-stops $p$ $p$ at either end of the chamber B', the movement of the ball can be readily controlled, and the oscillation of the measuring-pan adjusted with entire accuracy.

The chamber B' is rigidly attached to the end of the measuring-pan C, as is shown in Figs. 7 and 8. The spring-stops $o'$ $o'$, attached to the case A, arrest the sides of the measuring-pan as they alternately rise in oscillating, and, by means of the spring, prevent any jar which would affect the accurate working of the meter.

The spurs $c$ on the end of the pan C alternately strike the stops $d$, projecting from below the end of the pan B, (see Figs. 7 and 8,) which causes the latter to oscillate with the oscillations of the former, but in the opposite direction, as shown in Figs. 7 and 8. Thus, when one side of the measuring-pan rises to catch the flowing liquid for the purpose of measurement, the motion of this pan causes the receiving-pan to tilt so as to pour the liquid from the latter into the former, and in a thin broad stream. (See Fig. 7.)

When the weight of liquid received into the measuring-pan becomes equal to the weight or resistance of the ball it causes the measuring-pan to descend, and, the pin $d$ being relieved from the pressure of the spur $c$, Fig. 7, the receiving-pan B assumes an upright position, as shown in Fig. 2, and continues to receive the flow of liquid until the measuring-pan on the opposite side presents itself to receive the flow, and, by means of the opposite spur $c$, tilts the receiving-pan again, and the flow of the liquid again commences, but in the opposite direction. (See Fig. 8.) Thus the measuring-pans alternately discharge and register their contents.

It is known that the variations in the proof and temperature of spirits will alter the volume and seemingly render a correct measurement of it by a meter impossible. Practical tests prove this to be otherwise, and show that my meter will give a correct measurement of the spirits, regardless of its proof or temperature.

At each alternate discharge of the measuring-pan a sample of the spirits is taken and preserved by means hereinafter to be explained. These samples are carefully preserved and mixed in the sample-chamber, and, by means of a "table of multipliers," based upon careful computations and practical tests, and a series of tables published and furnished by the United States Treasury Department to all public gagers of spirits, the true volume of proof-spirits which has passed the meter is easily determined.

To the front end of the measuring-pan C are attached two pawls, $l$ $l$, which impart motion to the debit and credit registers as the pan oscillates. These registers may be constructed in the ordinary way in which registers are made for water or other meters. At the lower side of the upper chamber is placed the outlet-pipe F, provided at its outer end with a two-way cock, $k$, connected with and operating a rod, $f$, (see Figs. 3 and 12,) passing up through the outlet-pipe F, and terminating with a cross-head, $m$, (see Figs. 3 and 6,) which cross-head, as the cock is turned, engages or releases one of the pawls $l$, attached to the measuring-pan, from the ratchet $r$ of the credit register, thus arresting or controlling the movement of that register at will, as shown in Fig. 3.

The debit register continues in motion during the whole time the meter is in operation, and registers the whole amount of liquid which passes the measuring-pan.

The debit register is only used when liquor is being drawn off to be returned to the still, and, therefore, not to be included in the amount estimated or registered as passing through the meter.

When the credit register is used the amount indicated on its face is to be deducted from the amount as shown to be registered by the debit register, and the remainder will be the true amount of proof-liquor which has passed through the meter.

At one side of the upper chamber, and directly opposite to one of the compartments of the measuring-pan, are placed the sample-tubes $m'$ and $n'$, (see Fig. 3,) one of which, $m'$, has its termination on the outer side of the case A. Through this tube samples of the spirits passing through the meter can be taken at any time by moving the slide $s$ by means of the rod $f$ and lever $s'$, and exposing the slot in the tube to the flow of liquid from the measuring-pan, as shown in Fig. 7. The sample-tube $n'$ passes down into the sample-chamber, where all samples are preserved and mixed for the use of the gager.

The slots in the sliding cases are so arranged that the slots in the sample-tubes can be alternately opened or closed, and thus secure a delivery of a sample of the liquid outside of the case A, or pass it into the sample-chamber below, as may be desired.

G is a case, inserted at a proper point in the case A, in which the registers are placed and secured. H is an overflow-pipe, extending from a proper distance above the diaphragm $a$ in the upper chamber down to a point below the bottom of the case A. This pipe guards against the possibility of flooding the upper chamber, and also acts as a ventilating-pipe for that chamber.

The mixing-rod J, Fig. 2, passes through a tube from the outside of the cap and down to the sample-chamber. On the lower end of this is secured an arm or dasher, J'. By means of the crank at the top of the rod this dasher is made to move through and thoroughly mix the samples for the use of the gager.

K is a two-way cock, attached to the lower end of the discharge-pipe, and is so constructed that the person in charge of the meter is able to change the direction of the flow, as shown in Figs. 3 and 12, and at the same time operate, by means of the rod $f$, the sliding cases $s$ $s$ and the cross-head $m$.

The inlet-pipe L (see Figs. 2 and 3) is closed at its lower end, having discharge-openings on either side, so that the liquid, in entering the receiving-pan, will not impinge on the surface of the pan and affect its momentum, but will steadily flow over the edge of the pan by force of gravity only.

H' is a tube for holding a hydrometer, and $t$ is a cock for emptying the sample-chamber.

In order to guard against corrosion and a deposit of fusel-oil or other improper matter on the pans, bearings, and other moving parts of my meter, and thereby secure entire accuracy of measurement, I find it desirable to have these several parts nickel-plated.

The spring-stops $o'$ $o'$ and $p$ $p$ (see Fig. 13) are constructed so as to admit of a double adjustability, for the better regulating and controlling the movements of the ball and the oscillations of the measuring-pan.

The screw-plug in the head of the stop adjusts the spring and the plug at the opposite end, while the stop itself is also adjustable by means of the outer screw-thread, thus securing a twofold adjustability.

Claims.

Having explained my invention, what I claim as new, and desire to secure by Letters Patent, is—

1. The receiving-pan B, constructed and operated as described, in combination with the measuring-chamber C, substantially as and for the purpose set forth.

2. The oscillating chamber B', having a bottom constructed of two inclines, connected with a curve and controlled by a ball, in combination with the measuring-chamber C, substantially as and for the purpose described.

3. The inlet-pipe L, constructed with a closed bottom and side openings, in combination with a receiving-pan, substantially as and for the purpose described.

4. The slotted sample-tubes $m'$ and $n'$, with their sliding cases $s$ $s$, substantially as and for the purpose set forth.

5. The two-way delivery-cock K, constructed as described, in combination with the rod $f$, cross-head $m$, arranged and operating substantially as and for the purpose set forth.

6. The two-way cock K, constructed as described, in combination with the rod $f$, lever $s'$, and slides $s$ $s$, substantially as and for the purpose described.

7. The spring-stops $o'$ $o'$ and $p$ $p$, constructed so as to be doubly adjustable, and operating as described.

T. C. HARGRAVE.

Witnesses:
C. H. FOWLER,
F. A. LEHMANN.